United States Patent
Cui et al.

(10) Patent No.: US 9,947,233 B2
(45) Date of Patent: Apr. 17, 2018

(54) METHOD AND SYSTEM TO IMPROVE SAFETY CONCERNING DRONES

(71) Applicant: AT&T Intellectual Property I, L.P., Atlanta, GA (US)

(72) Inventors: Zhi Cui, Sugar Hill, GA (US); Sangar Dowlatkhah, Alpharetta, GA (US); Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/207,874

(22) Filed: Jul. 12, 2016

(65) Prior Publication Data

US 2018/0018881 A1    Jan. 18, 2018

(51) Int. Cl.
*G08G 5/00* (2006.01)
*B64D 45/00* (2006.01)
*B64C 39/02* (2006.01)
*G08B 21/18* (2006.01)

(52) U.S. Cl.
CPC ............ *G08G 5/006* (2013.01); *B64C 39/024* (2013.01); *B64D 45/00* (2013.01); *G08B 21/182* (2013.01); *G08G 5/0013* (2013.01); *G08G 5/0039* (2013.01); *G08G 5/0069* (2013.01); *G08G 5/0082* (2013.01); *B64C 2201/00* (2013.01)

(58) Field of Classification Search
CPC .... G08G 5/006; G08G 21/182; G08G 5/0039; B64C 39/024
USPC ............................................................ 701/3
See application file for complete search history.

(56) References Cited

U.S. PATENT DOCUMENTS

| | | |
|---|---|---|
| 6,675,095 B1 | 1/2004 | Bird et al. |
| 7,127,334 B2 | 10/2006 | Frink |
| 7,598,888 B2 | 10/2009 | Matuska et al. |
| 7,786,900 B2 | 8/2010 | Bitar et al. |
| 7,979,199 B2 | 7/2011 | Judd et al. |
| 8,078,350 B2 | 12/2011 | Coulmeau |
| 8,983,682 B1 | 3/2015 | Peeters et al. |
| 9,152,147 B2 | 10/2015 | Khazan et al. |
| 9,256,225 B2 | 2/2016 | Downey et al. |
| 9,256,994 B2 | 2/2016 | Downey et al. |
| 9,292,705 B2 | 3/2016 | Lemmey et al. |
| 2009/0012661 A1 | 1/2009 | Louis |
| 2012/0143482 A1 | 6/2012 | Goossen et al. |
| 2014/0018979 A1 | 1/2014 | Goossen et al. |
| 2015/0336667 A1 | 11/2015 | Srivastava et al. |

(Continued)

FOREIGN PATENT DOCUMENTS

CN          104932525 A      9/2015

OTHER PUBLICATIONS

"DJI Introduces New Geofencing System for its Drones"; http://www.dji.com/newsroom/news/dji-fly-safe-system; DJI; Nov. 17, 2015; accessed Apr. 26, 2016; 10 pages.

*Primary Examiner* — Yazan S Soofi
(74) *Attorney, Agent, or Firm* — Haynes and Boone, LLP (57) ABSTRACT

A method and system for controlling access to restricted sectors in airspace. The method includes creating a multi-dimensional map of airspace, overlaying a sector having boundaries onto the map, wherein the sector contains a restricted flight zone and a buffer zone monitoring the flight of an unmanned aerial vehicle (UAV), sending a command to the UAV if the UAV enters the buffer zone; and generating a response if the UAV does not leave the sector based on the command.

20 Claims, 7 Drawing Sheets

(56) References Cited

U.S. PATENT DOCUMENTS

| | | |
|---|---|---|
| 2016/0071420 A1 | 3/2016 | Heilman |
| 2016/0225264 A1* | 8/2016 | Taveira ................. B64C 39/024 |
| 2017/0076610 A1* | 3/2017 | Liu ....................... B64C 39/024 |
| 2017/0123425 A1* | 5/2017 | Zhao .................... G05D 1/0202 |

* cited by examiner

METHOD AND SYSTEM TO IMPROVE SAFETY CONCERNING DRONES

TECHNICAL FIELD

Embodiments of the present inventions relate to methods and systems for controlling unmanned vehicles (UVs), and more particularly to methods and systems that provide maps and flight controls of an Unmanned Arial Vehicle ("UAV") to enforce no-fly or restricted fly zones.

BACKGROUND

Today a large number of companies are greatly expanding their use of UAVs. UAVs have been used for military applications, search-and-rescue missions, scientific research, delivering goods, and other uses. UAVs can include a plurality of airborne platforms or air vehicles, each carrying a plurality of sensors that may be used to collect information about an area under surveillance or to deliver a payload to a certain location. The airborne platforms may communicate with users, which may include persons or equipment, that desire access to data collected by the sensors or desire to control the UAV. More sophisticated UAVs have built-in control and/or guidance systems to perform low-level human pilot duties, such as speed and flight path surveillance, and simple pre-scripted navigation functions.

While UAVs are becoming increasingly valuable with commercial, government and recreational uses, having multiple UAVs flying in an area of the sky may also increase potential risk. For example, commercial UAVs flying over an area designated as an emergency zone may pose a risk for first responders or other UAVs being used by first responders. A UAV flying over a military or government installation may pose a security risk. A UAV entering into an area saturated with other UAVs may pose a flight risk for itself or other UAV's. For this reason, a mechanism is needed to warn or move a drone if it causes a safety concern, which may, for example result from the UAV fling into an RF fencing safety buffer or near a no-fly or restricted flight zone.

SUMMARY

In an embodiment, a method for providing safety and security for UAV's by establishing no-fly and restricted flight sectors and buffer sectors surrounding those sectors. The method includes creating a multi-dimensional map of airspace, overlaying a sector having boundaries onto the map, wherein the sector contains a restricted flight zone and a buffer zone, monitoring the flight of an unmanned aerial vehicle (UAV), sending a command to the UAV if the UAV enters the buffer zone and generating a response if the UAV does not leave the sector based on the command. The response may include sending a second command to the UAV to override a current flight plan of the UAV or generating an alarm. Access to the sector may be restricted to one of time of day, authorization levels, and number of UAVs in the sector. The boundaries may be generated based on events and then transmitted to the UAV or the boundaries may be received from a second UAV and transmitted to the UAV. The boundaries may move as a function of time or the boundaries may move based on the movement of events on the ground. The method may further include receiving a request from the UAV to enter the sector and transmitting a response to the UAV.

The disclosure may also include a system having a UAV and a command and control center in which a processor in the command and control center is connected to a memory, the memory including instructions which when executed by the processor, performs the functions set forth above.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

Figure 1:
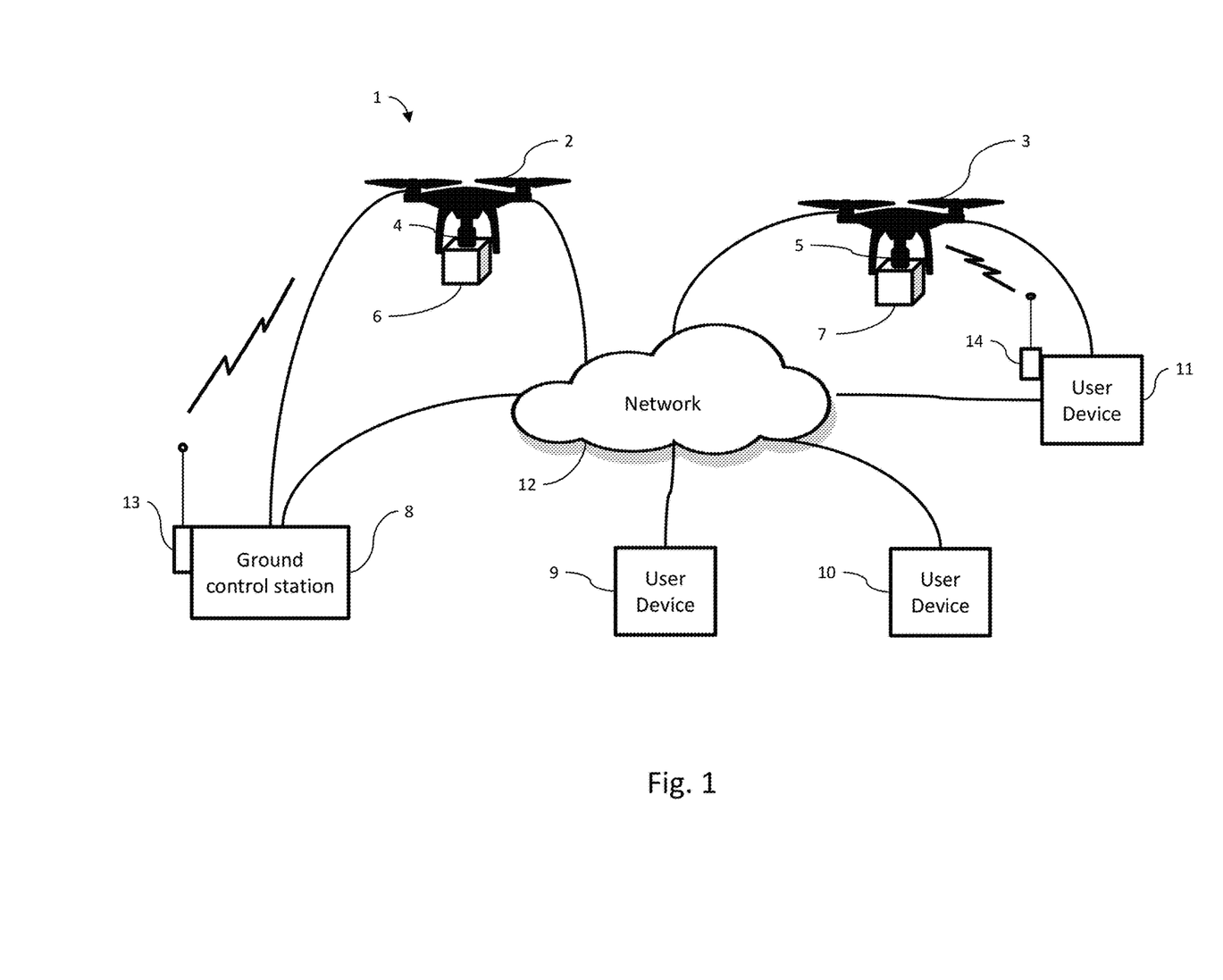
FIG. 1 is a schematic representation of an exemplary system environment in which the methods and systems to dynamically manage flight paths of UAVs near areas of concern may be implemented.

System Environment. Illustrated in FIG. 1 is a schematic representation of a exemplary system environment 1 in which embodiments of the present disclosure may operate. The system environment 1 includes UAV 2 and UAV 3, each carrying sensors (sensor 4 and sensor 5) for collecting information or payloads (payload 6 and payload 7) for delivery. Although only two UAVs are illustrated in FIG. 1, it is contemplated that the system environment 1 would encompass a plurality of UAVs. UAV 2 and UAV 3 may communicate with a command and control center 8 and a plurality of user devices (user device 9, user device 10, and user device 11). Command and control center 8 may communicate with UAV 2 through a network 12 or an RF transmitter 13. Similarly user device 11 may communicate with UAV 3 through the network 12 or an RF transmitter 14. Network 12 may be a distributed network such as the Internet or a wireless cellular network, which may, for example, be a 3G, 4G LTE network, or any number of wireless networks that are capable of providing a communication interface to the plurality of UAVs. User device 9, user device 10 and user device 11 may comprise any wireless device such as a cell phone, a smart phone, personal data assistants (PDA) or a personal computer such as a desktop, a laptop computer or a tablet computer. Command and control center 8 may be part of a larger command and control center (not shown) which controls not only UAV flights, but which may also include other military, commercial or private flights. The command and control center is typically a facility that operates as the operating entity's dispatch center, surveillance monitoring center, coordination office and alarm monitoring center all in one. Command and control centers may be operated by the operating entity.

Figure 2:
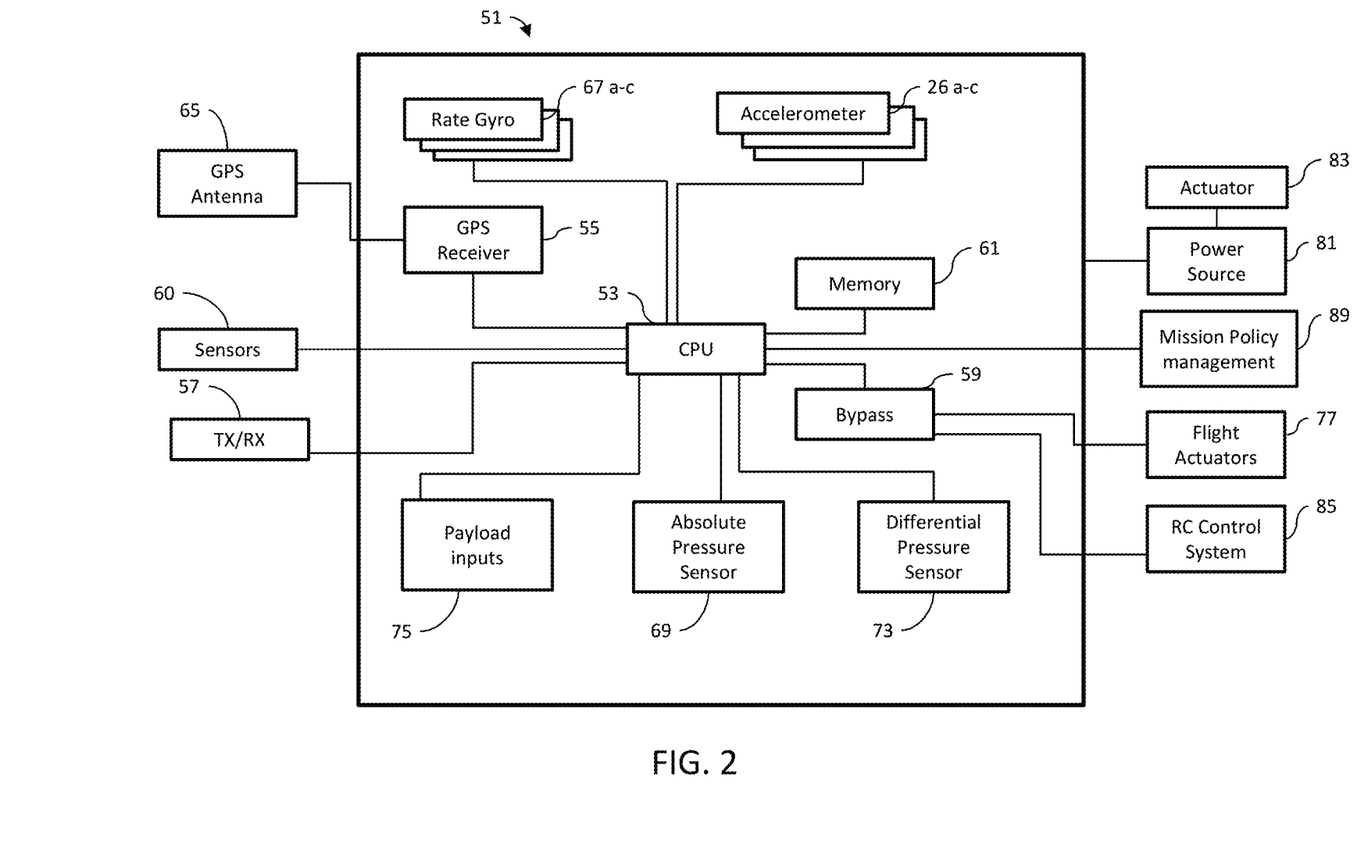
FIG. 2 is a system diagram of an exemplary UAV control system.

UAV Control System. FIG. 2 is an exemplary block diagram illustrating the main hardware and system components of one embodiment of a UAV control system 51. The UAV control system 51 includes a central processing unit (CPU 53), which is responsible for processing data and executing commands and instructions. The CPU 53 may be responsible for processing sensor data, handling I/O to a GPS receiver 55, a UAV transmitter/receiver 57, and bypass circuit 59, thereby enabling communications with the ground station. The UAV control system 51 is provided with sufficient memory to store the autopilot source code and effect runtime execution. The CPU 53 is in electronic communication with various sensors and may, for example, be responsible for processing raw data from the various sensors such as sensor 60 and storing and transmitting the data. Data is stored in memory 61, which is in electronic communication with the CPU 53. The memory 61 may include random access memory (RAM), flash memory or any other type of memory technology currently available. To control a UAV such as UAV 2 in FIG. 1, the UAV control system 51 may have access to the location coordinates of UAV 2. These coordinates are measured using the GPS receiver 55 that is in electronic communication with the CPU 53. The GPS receiver 55 receives its data through a GPS antenna 65. The fixed rotational rates of UAV 2 may be measured by rate gyros 67a, 67b, and 67c which are in electronic communication with the CPU 53. The rate gyros 67a, 67b and 67c are disposed to enable sensing of the rotational rates about the body axes of the UAV 2. The altitude of the UAV may be measured using an absolute pressure sensor 69 or other altitude measuring device that is in electronic communication with the CPU 53. Acceleration in the x, y, and z axes may be measured by accelerometers 26a, 26b, and 26c which are in electronic communication with the CPU 53. The velocity of UAV 2 may be measured using a differential pressure sensor 73 in electronic communication with the CPU 53. The differential pressure sensor 73 outputs a voltage based on the difference in pressure between its two external ports. A pitot tube may be connected to one of the ports and the other is left open to the ambient air. The flow of air against the pitot tube causes a pressure difference proportional to the speed of the air. The corresponding voltage produced by the differential pressure sensor 73 is used to calculate the airspeed of the UAV 2. The CPU 53 may be also in electronic communication with a payload inputs 75 which may include data from a video processing unit or any other data that involves a payload (such as payload 6) on the UAV. The UAV is controlled using flight actuators 77 which include servos in electronic communication with the CPU 53 that control the flight of the UAV 2. The bypass circuit 59 may be provided to allow a user to take control of the UAV 2. The UAV control system 51 is electrically connected to a power source 81. In one embodiment the power source 81 may include a plurality of batteries. The power source 81 may be used to power the UAV control system 51 and connected accessories. The power source 81 may also be used to power an actuator 83 that propels the UAV 2. The UAV control system 51 may be provided with an RC control system 85 that allows a user to take control of a UAV (such as UAV 3) using an RF transmitter such as RF transmitter 14 or RF transmitter 13 shown in FIG. 1.

The UAV control system 51 may interact with a mission policy management system 89, which are described in more detail below, and that control access to the UAV control system 51 by user devices such as user device 11 (shown in FIG. 1). The access management system 87 and the mission policy management system 89 may be implemented in the UAV 2 or in the network 12.

Figure 3:
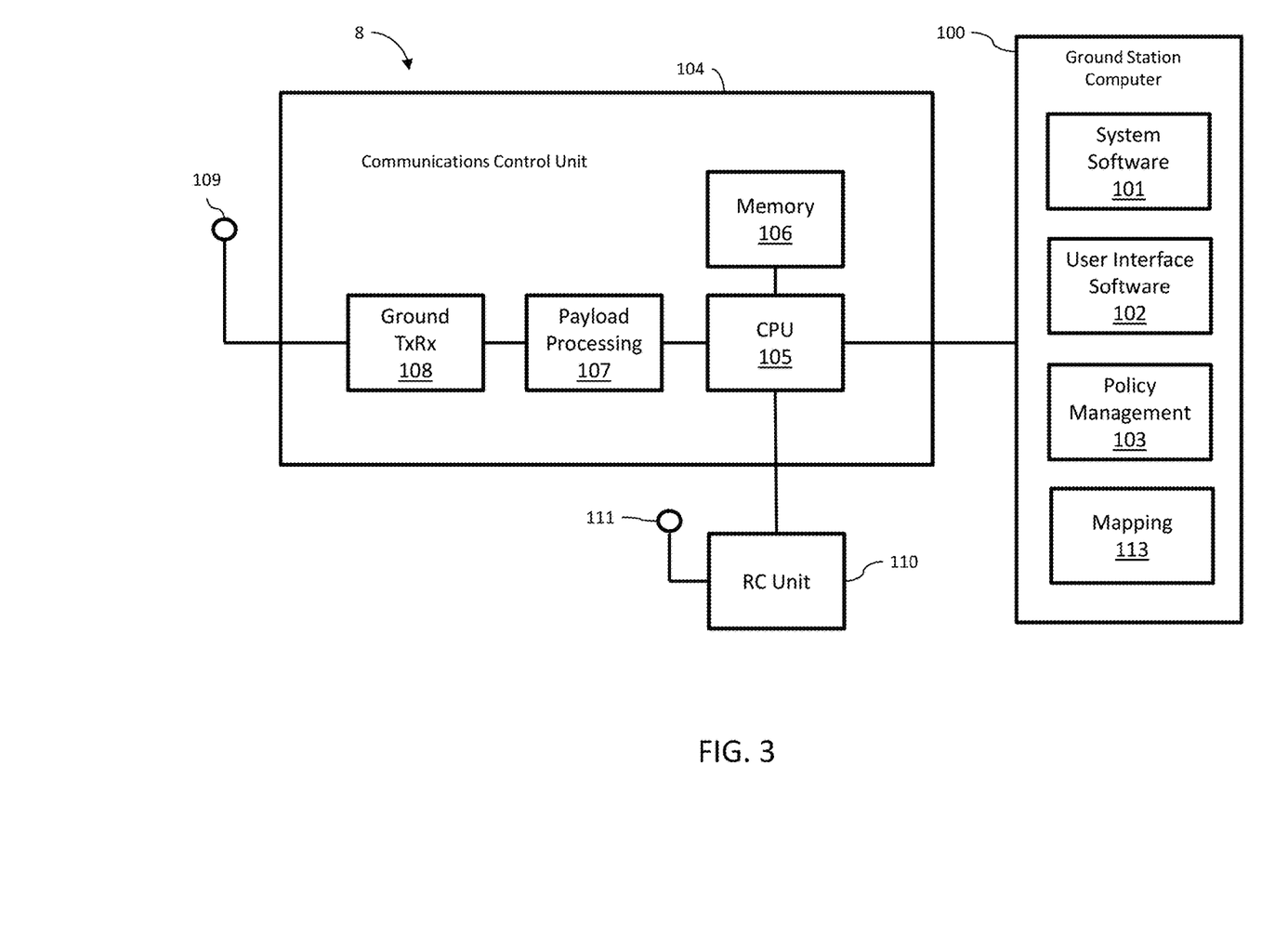
FIG. 3 is a system diagram of an exemplary embodiment of a UAV command and control center.

Command and Control Station. FIG. 3 is a block diagram illustrating the main hardware components of a command and control center 8. The command and control center 8 includes a ground station computer 100. The ground station computer 100 may be a laptop computer, a desktop computer, a personal digital assistant, a tablet PC, a wireless device such as a smart phone or similar devices. The ground station computer 100 runs ground station system software 101 as well as user interface software 102. The ground station computer 100 may also run policy management software 103 that provides mission management parameters to the UAV during operations. The ground station computer 100 is in electronic communication with a ground unit 104. Electronic communication between the ground station computer 100 and the ground unit 104 may be accomplished via a serial or USB port. Ground unit 104 may include CPU 105, memory 106, a payload processing system 107, a ground transmitter/receiver 108, and a ground antenna 109. CPU 105 processes data from the ground station computer 100 and the UAV such as UAV 2 in FIG. 1. The payload processing system 107 processes any payload data received from the UAV control system 51, (shown in FIG. 2), or payload commands from the ground station computer 100. The payload processing system 107 may also be connected directly to CPU 105 or the ground station computer 100. Data from the payload processing system 107, CPU 105, or the ground station computer 100 is sent through the ground transmitter/receiver 108. The ground transmitter/receiver 108 also receives data from the UAV control system 51 (shown in FIG. 2). In an embodiment an RC controller 110 in electronic communication with the command and control center 8 (shown in FIG. 1) may be provided. The CPU 105 may also be connected to an RC unit 110 with RC antenna 111 that can be used to control the UAV 3 (shown in FIG. 1) using RC signals.

The ground station computer 100 may also include a mapping function 113. The mapping function 113 may, for example, include a three-dimensional ("3D") map of a volume of space through which a UAV may fly. The mapping function 113 may also include two-dimensional ("2D") mapping function. The mapping function 113 may include the ability to partition the space volume into either 3-dimensional volume-based sectors or two-dimensional area-based sectors encompassing and defining space in two dimensions from the ground to a relatively high altitude above the ground. For the purpose of this disclosure and claims, the use of the term "sector" will include both 3D volume sectors as well as 2-dimensional area sectors. The use of such sectors will be described in greater detail with reference to FIG. 5 below. The mapping function 113 may create sectors off-line and share those sectors with UAVs 2, 3 prior to or during flight. The mapping function 113 may also receive inputs from a user through user interface software 102 which could create additional or alter existing sectors based on real-time or near-real time inputs. Those inputs may, for example, include the location of a presidential motorcade on a particular freeway, thereby creating the need to define a sector dynamically such that a no-fly zone or restricted fly zone may be implemented and updated periodically as the motorcade progresses through its route. Static and dynamically generated maps may be communicated to UAVs 2, 3 through the RF interface 111.

In accordance with an alternative embodiment, sectors may be generated by a UAV, for example, UAV 2 or UAV 3, and communicated wirelessly from the UAV to the command and control center 8. Such functionality may prove useful, for example, in an emergency situation such as a traffic accident or an industrial incident in which a sector has to be mapped from the air by a UAV in order to create the boundaries of sector that will ultimately be set up as a no-fly or restricted flight zone and then communicated to other UAVs in real time or near real time to provide a no fly zone or restricted fly zone for all other UAVs until the emergency situation is resolved. The foregoing use case is exemplary only and is not intended to limit the scope of the present disclosure.

Figure 4:
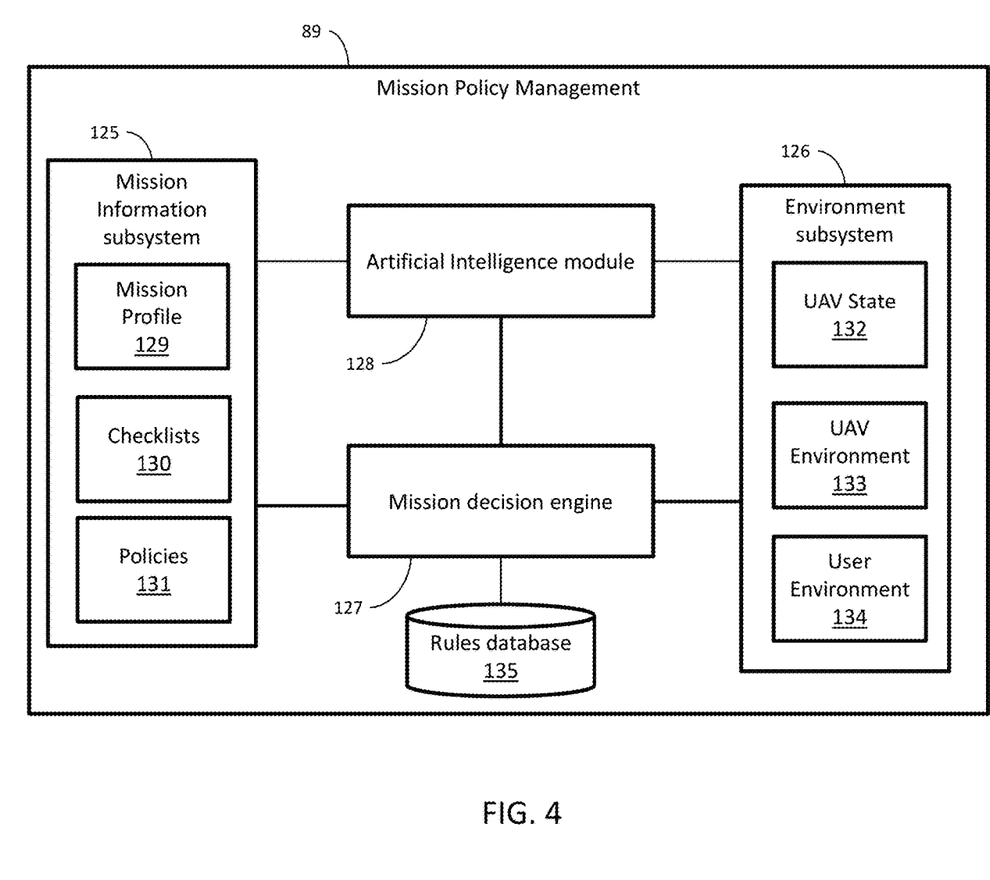
FIG. 4 is a system diagram of an exemplary embodiment of a mission policy management system.

Mission Management System. Illustrated in FIG. 4 is an exemplary embodiment of the mission policy management system 89. The mission policy management system 89 may include a mission information subsystem 125 and an environment subsystem 126. The mission information subsystem 125 and the environment subsystem 126 may be coupled to a mission decision engine 127. Mission decision engine 127 may optionally be coupled to an artificial intelligence module 128 if the UAV is intended to have a self-learning capability.

The mission information subsystem 125 may include a mission profile module 129 that stores and processes mission profile information relating to the type of mission such as reconnaissance, attack, payload delivery, and the like. Associated with each mission profile will be a set of mission parameters such as regions that must be visited or avoided, time constraints, time of year, flight altitude, flight latitude, and payload mass and power, initial position of the target, direction of a target, and flight path, among others.

The mission information subsystem 125 may include a checklist module 130 that stores and processes checklists to ensure that the UAV is performing correctly during flight. Prior to and during operation, the unmanned vehicle may undergo one or more verification procedures that are performed according to one or more corresponding checklists. The checklists in the checklist module 130 generally include a sequence of various operating parameters to be verified for proper functionality and/or control actions to be taken once required operational parameters have been achieved. For example, a particular checklist implemented prior to take off may include verification of the unmanned vehicle's fuel supply and other suitable operating parameters. In addition to a checklist implemented for use with takeoff, other checklists may be implemented for other tasks performed by unmanned vehicles, such as a change in flight plan, or in response to specific events or situations that may arise during any particular mission.

The mission information subsystem 125 may also include a policies module 131. Policies module 131 may include a set of policies related to the level of control to be exercised by the command and control center 8 during flight. For example, a commercial UAV may have policies that permit flight to and from commercial distribution centers to target destinations, but restricted from airspace over military installations. A military UAV carrying weapons may have policies that permit flight in certain areas but may restrict flight over certain population centers. Other parameters for policies may include UAV and target location, customer and operator preferences, UAV status (e.g. power, type, etc.), next mission on the list, available resources and the like. The policies may, for example, contain levels of authorization which will dictate, based on defined or dynamic sectors, where a UAV may fly and where a UAV may not fly. The policies may also include authorization levels for modifying such policies during flight operations.

The environment subsystem 126 may include a UAV state module 132 which may include information about the state of the UAV such as power, payload capacity, distance to user, location and the like.

The environment subsystem 126 may also include a UAV environment module which may include information about the environment in which the UAV is operating such as weather, threat level and the like. The environment subsystem 126 may also include a user environment module which may include information about the environment in which the ground-based user is operating, such as weather, location, terrain, threat level and the like.

The mission information subsystem 125 and the environment subsystem 126 may be coupled to the mission decision engine 127 configured to receive mission parameters from the mission information subsystem 125, fetch a plurality of mission plans from the mission profile module 129, and select one of the plurality of mission profiles based upon the current requirements and the environmental parameters. The mission decision engine 127 may access a rules database (not shown) that provides rules to the mission decision engine 127. The mission decision engine 127 may also receive updated mission parameters during flight that alerts the mission information subsystem of updated sectors that may include no-fly or restricted flight zones based on the level of authorization of the UAV.

The artificial intelligence module 128 may include an inference engine, a memory (not shown) for storing data from the mission decision engine 127, heuristic rules, and a knowledge base memory (not shown) which stores network information upon which the inference engine draws. The artificial intelligence module 128 is configured to apply a layer of artificial intelligence to the mission profiles stored in the mission profile module 129 to develop relationships between mission parameters to perform and improve the assessments, diagnoses, simulations, forecasts, and predictions that form the mission profile. The artificial intelligence module 128 recognizes if a certain action (implementation of mission parameters) achieved a desired result (successfully accomplishing the mission). The artificial intelligence module 128 may stores this information and attempts the successful action the next time it encounters the same situation. Likewise, the artificial intelligence module 128 may be trained to look for certain conditions or events that would necessitate the need or desire to define sectors to be used as no-fly zones or restricted fly zones. Such defined sectors may then be transmitted to the command and control system 8. The mission policy management system 89 may be incorporated in the UAV or may be a component of the network 12. It will be understood that the mission policy management system 89 described above may include all or a subset of the functions set forth above, or may include additional functions. Such a description is exemplary only and is not intended to limit the scope of the disclosure.

Figure 5:
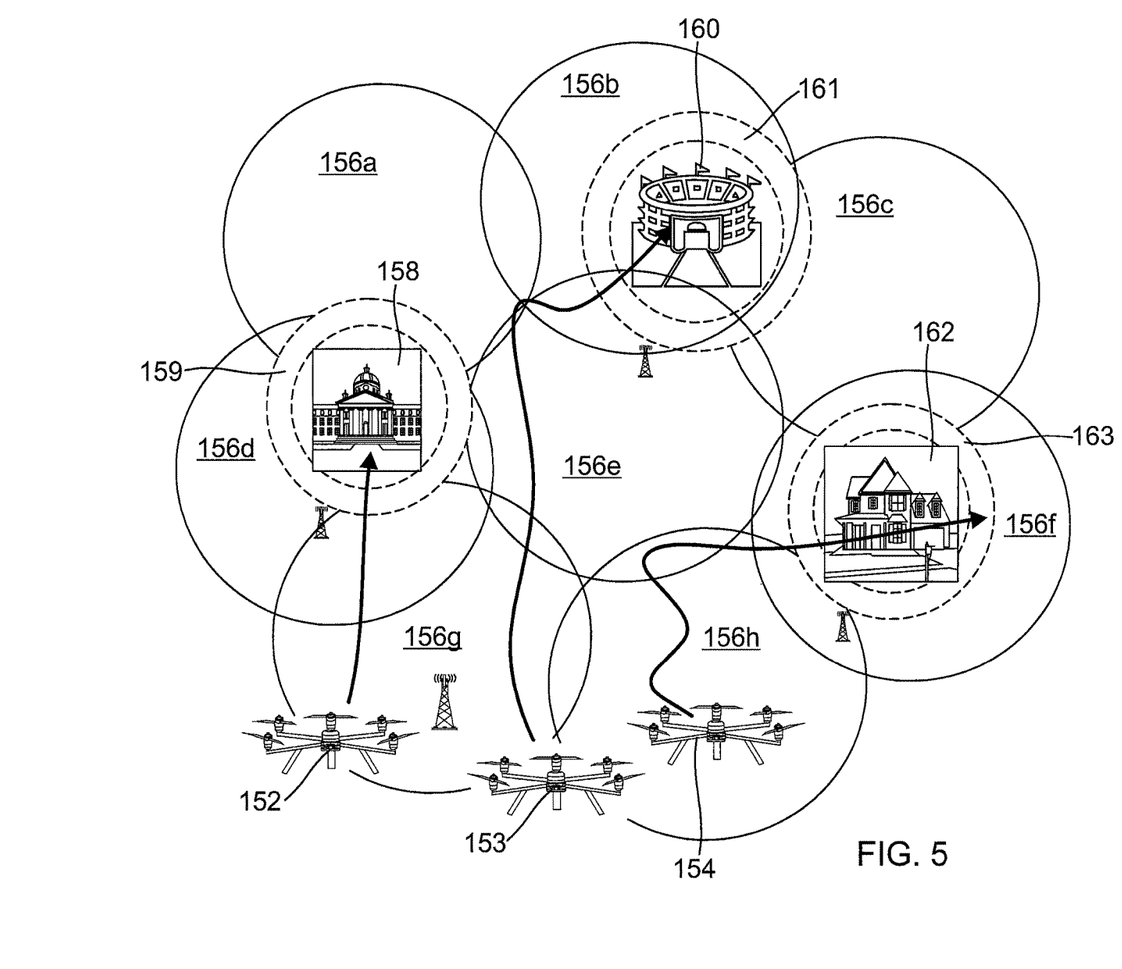
FIG. 5 is a exemplary diagram implementing the concept of no-fly zones and buffer zones.

FIG. 5 shows an example of the mapping of sectors and how those sectors may define no-fly zones, restricted flight zones, and buffer zones. There is shown a plurality of sectors 156a-156h. While those sectors are shown as similarly-sized, intersecting circles, it will be understood that the sectors may be defined to be any size and/or shape, intersecting or non-intersecting, and 2-dimensional or 3-dimensional.

By way of example only, shown within the sectors are three landmarks, a government building 158, a sports stadium 160 and a residential house 162. Each of those landmarks may include the definition of a buffer zone, shown as 159, 161, and 163. A buffer zone 159, 161, 163 may be a 2D or 3D sector of any size or shape and may, for example, be used as a warning area for a UAV about to enter into a no-fly or restricted zone surrounding the landmarks 158, 160, and 162.

By way of example, UAV 152 may or may not be authorized to fly over landmark 158 or buffer zone 159. UAV 153 may or may not be authorized to fly over landmark 160 of buffer zone 161. UAV 154 may or may not be authorized to fly over landmark 162 or buffer zone 163. Such authorization may be programmed in advance and off-line and stored in the mission policy management system 89 or updated in real-time or near real time during flight and communicated to the UAV 152, 153, 154 during flight from the command and control system 8. Updates to the respective authorizations may be provided by a UAV in flight and communicated to other UAVs through the command and control system 8. Alternatively, updates to the respective authorizations may be made off-line and communicated to the UAVs through the command and control system 8. Such authorizations may be further limited by time-of-day, weather, payloads, or any number of other filters.

In operation, there may, for example, be a presidential event or other event at stadium 160. If a presidential event, it may be that only secret service UAVs and a limited number of authorized news oriented UAVs are allowed in or near the stadium 160 during the event. The no-fly zone above stadium 160 and its associated buffer zone 161 related to the stadium 160 may be pre-programed into the UAVs flying in this area along with a permitted flying path. When a UAV flies into the buffer zone 161, a request is triggered to send to the command and control unit 8 a request for permission to enter. If allowed, the permission is granted with a tag indicating the ATS in the zone. If the UAV is not allowed, the permission to enter is denied, e.g. with the ATS=0, and the UAV has to leave immediately. A command is triggered to ask it to leave the No-fly zones/RF buffer zone immediately. In addition, if the UAV does not leave within a programmable interval an alarm can be triggered or countermeasures taken. The restricted sector above the stadium 160 and the buffer zone 161 may be restricted as a function of time.

By way of another example, a UAV may be used with respect to the sale of a home. A home 162 may be for sale. Her agent had made a few appointments with several potential buyers' real estate agents to survey the property prior to an onsite visit. In order to control UAV traffic in and around the home 162 and the buffer zone 163, a temporary permit is given to an approved list of UAVs for a given period of the time during which only UAVs on that list are permitted to fly over the property while and other UAVs are not permitted. For the permitted UAVs a tag is assigned with ATS=x as well as the areas allowed/not-allowed to enter, e.g. all the areas except the pool area to prevent taking pictures of kids swimming. For other UAVs the permission to enter is denied, e.g. with the ATS=0, and the UAV must leave the protected sector. A command is triggered to request that the UAV leave the No-fly sector/RF buffer zone sector. In addition, if the UAV does not leave within a programmable interval an alarm can be triggered or countermeasures taken. It will be understood that certain limitations on permitted sector entry may be made, for example, never allow UAVs to fly over a swimming pool area, and such limitations are within the scope of the present disclosure.

Another use case may include the package delivery to a military campus. In general, it may be the case that a government building 158 or military campus (not shown) not allow any non-government or non-military related UAVs to fly over or near the government building 158 or inside or near the campus. But when packages are scheduled and permitted to be delivered to the government building 158 or military campus, a temporary permission may be provided to the UAV. The restricted sector and its associated RF buffer zone 159 related to the government building 158 or the military campus may be pre-programed into this carrier UAV. When a UAV flies into the buffer zone 159, a request is triggered to send to the command and control center 8 managed by the government or military management or via a command and control center 8 service provider to request permission-to-enter. The permission is granted to the carrier UAV on a temporary basis with a tag indicating the ATS in the sector, as well as the sectors permitted or not permitted to enter, for example, no areas are permitted to enter except the non-sensitive areas, like the front entrance. If the UAV is not permitted, the permission to enter is denied, e.g. setting the ATS=0, and the UAV must leave immediately. A command is triggered to request that the UAV leave the no-fly sector above the government building 158 or the RF buffer sector 159. In addition, if the UAV does not leave within a programmable interval an alarm can be triggered or countermeasures taken. It will be understood that certain limitations relating to a permitted sector entry may be made, for example, never allow UAVs to fly over military barracks or weapons training areas, and such limitations are within the scope of the present disclosure.

It will be understood that there are other use cases not illustrated. For example, a UAV may be deployed over an accident or a disaster area and develop a prohibited or restricted sector during flight and communicate that sector to other UAVs directly or through the command and control center 8.

Figure 6:
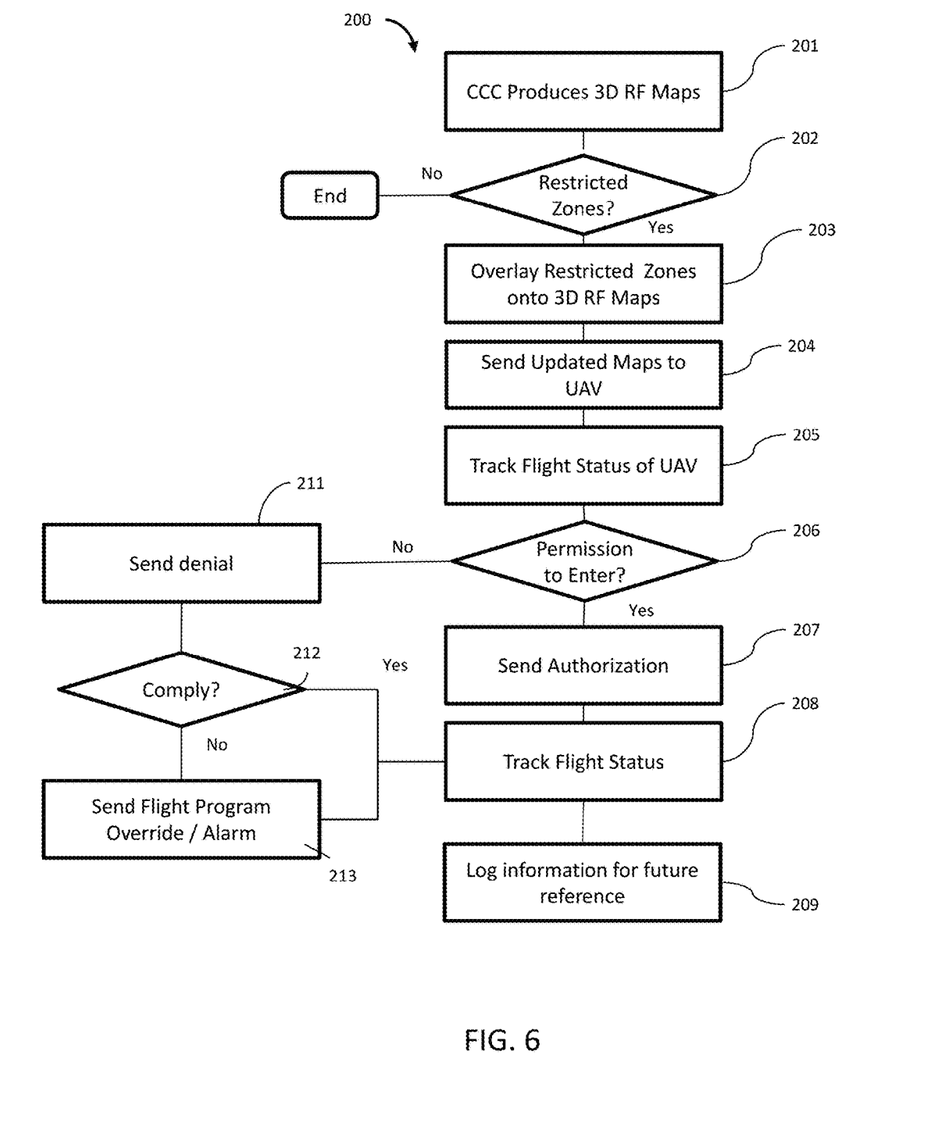
FIG. 6 is a flow diagram of an embodiment of a method for dynamically controlling the flight path of a UAV near areas of concern.

Illustrated in FIG. 6 is an embodiment of a method 200 for controlling the flight path of a UAV.

In step 202, a determination is made whether there are restricted zones. If not the process ends. If so, then the process continues at 203 in which the restricted sectors are overlaid onto the RF maps. The updated maps are then sent to the UAV at 204. The command and control system 8 continues to track the flight status of the UAV at 205 with the updated maps programmed into the UAV.

At 206, the command and control center receives a request for permission to enter. If permission is denied, the denial is sent at 211. At 212, the determination is made as to whether the UAV has complied with the denial of entry. If not, then a flight program override or an alarm or other countermeasure is effectuated at 213. If so, then the flight status is tracked at 208 and the information on the flight path and requests is logged at 209.

If permission to enter is granted at 206, then an authorization is sent at 207. The flight status is tracked at 208 and the information on the flight path and requests is logged at 209. control system 51 receives a request from a user for access to the UAV control system 51.

Figure 7:
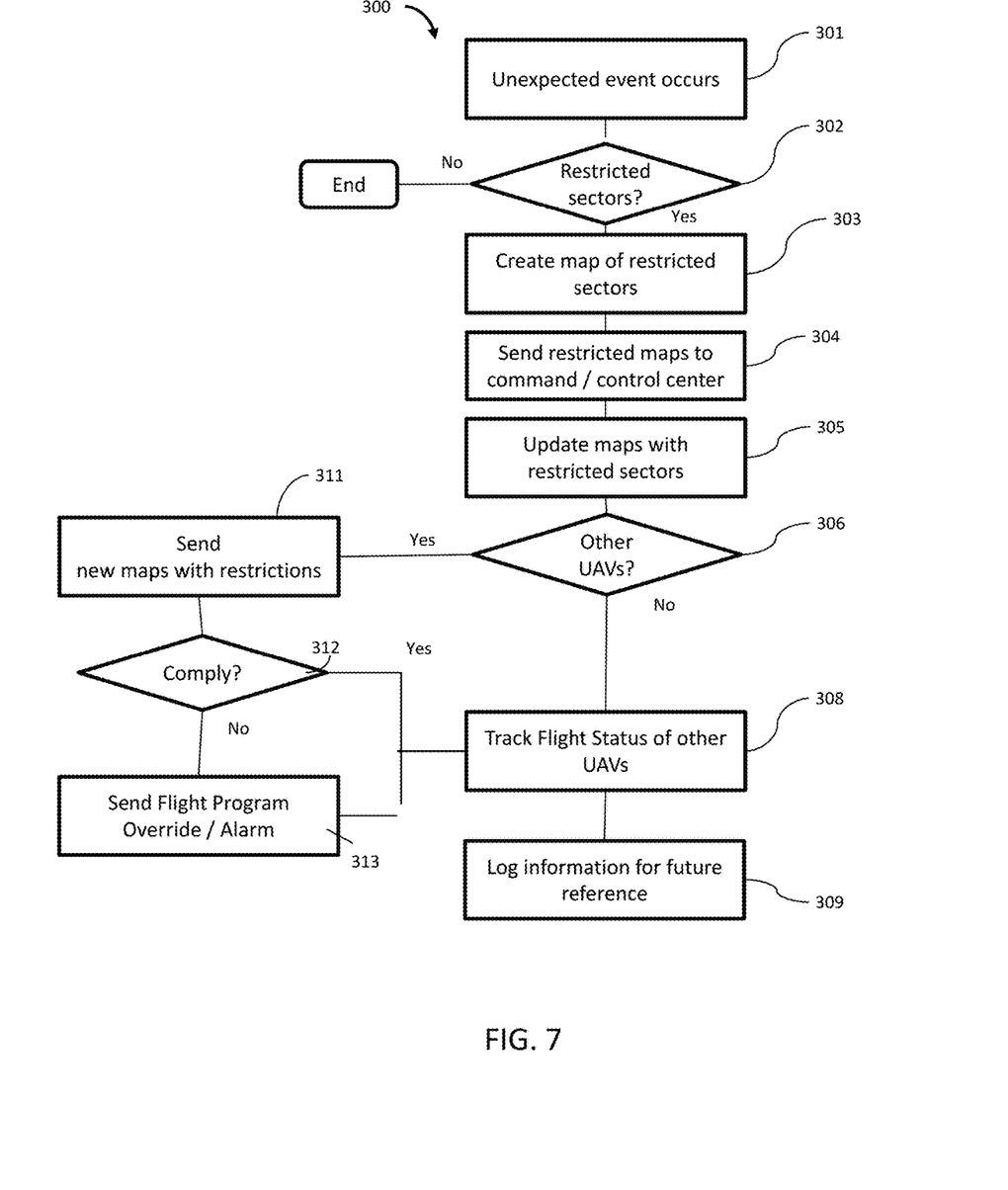
FIG. 7 is a flow diagram of an embodiment of a method for an unexpected event.

With reference to FIG. 7, there is shown an exemplary method 300 in which a UAV maps a restricted sector in flight. At 301, an unexpected event occurs, which may, for example, be a traffic accident, a fire or a natural disaster such as a flood or tornado. At 302, the UAV determines, itself or in conjunction with a command and control center 8, whether certain sectors should be restricted. If not, then no further action is taken. If so, then the UAV generates a restricted sector map at 303 and sends that map to the command and control center 8 at 304. The command and control center updates maps with the newly developed restricted sector at 305. At 306, a determination is made whether other UAVs are in the area. If so, a map with the new restricted sector is sent at 311. Note that such updated maps may be sent from the command and control center 8 or directly from the UAV that generated the updated maps. At 312, a determination is made whether the UAVs are in compliance with the restrictions in the updated maps. If not, then a flight program override may be sent or an alarm sounded at 313. If there are no other UAVs in the area or if the new UAVs are sent the updated maps, then the flight status is tracked at 308 and activity logged at 309.

In accordance with the present disclosure, there is provided the ability to improve the public safety in no-fly or restricted sectors or in or around other locations with safety or security concerns. There is provided the ability to provide the UAV with the instructions regarding when and where it is allowed to fly within the no-fly or restricted flight sectors. There is also provided the ability to trigger a command to the UAV to move if a UAV enters into the RF buffer sectors or no-fly sectors.

Although not every conceivable combination of components and methodologies for the purposes describing the present disclosure have been set out above, the examples provided will be sufficient to enable one of ordinary skill in the art to recognize the many combinations and permutations possible in respect of the present disclosure. Accordingly, this disclosure is intended to embrace all such alterations, modifications and variations that fall within the spirit and scope of the appended claims. For example, numerous methodologies for defining, restricting and enforcing restricted flight zones and corresponding buffer zones may be encompassed within the concepts of the present disclosure.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed:

1. A method comprising:
   creating a multi-dimensional map of airspace;
   overlaying a sector having first boundaries and second boundaries onto the map, wherein the sector contains a restricted flight zone having the first boundaries and a buffer zone having the second boundaries;
   monitoring flight of an unmanned aerial vehicle (UAV);
   sending a command to the UAV if the UAV enters the buffer zone; and
   generating a response if the UAV does not leave the sector based on the command.

2. The method of claim 1 wherein the command is sent to the UAV via a network, and wherein the response comprises a second command to the UAV to override a current flight plan of the UAV.

3. The method of claim 1 wherein the response comprises an alarm.

4. The method of claim 1 wherein access to the sector is based at least on one of a time of day, authorization levels, or a number of UAVs in the sector.

5. The method of claim 1 wherein the first and the second boundaries are generated based on events and then transmitted to the UAV.

6. The method of claim 1 wherein the first and the second boundaries are received from a second UAV and transmitted to the UAV.

7. The method of claim 1 wherein the first and the second boundaries move as a function of time.

8. The method of claim 1 wherein the first and the second boundaries move based on movement of events on the ground.

9. The method of claim 1 further comprising receiving a request from the UAV to enter the sector and transmitting a response to the UAV.

10. A system comprising:
    an unmanned airborne vehicle (UAV);
    a command and control center in communication with the UAV, the command and control center having a processor; and
    a memory coupled with the processor, the memory having stored thereon executable instructions that when executed by the processor cause the processor to effectuate operations comprising:
    creating a multi-dimensional map of airspace;
    overlaying a sector having first boundaries and second boundaries onto the map, wherein the sector contains a restricted flight zone having the first boundaries and a buffer zone having the second boundaries;
    monitoring flight of the UAV;
    sending a command to the UAV if the UAV enters the buffer zone; and
    generating a response if the UAV does not leave the sector based on the command.

11. The system of claim 10 wherein the response comprises a second command to the UAV to override a current flight plan of the UAV.

12. The system of claim 10 wherein the response comprises an alarm.

13. The system of claim 10 wherein access to the sector is based at least on one of a time of day, authorization levels, or a number of UAVs in the sector.

14. The system of claim 10 wherein the first and the second boundaries are generated based on events and then transmitted to the UAV.

15. The system of claim 10 wherein the first and the second boundaries are received from a second UAV and transmitted to the UAV.

16. The system of claim 10 wherein the first and the second boundaries move as a function of time.

17. The system of claim 10 wherein the first and the second boundaries move based on movement of events on the ground.

18. The system of claim 10 wherein the operations further comprise receiving a request from the UAV to enter the sector and transmitting a response to the UAV.

19. The method of claim 1, further comprising receiving, from a second UAV, information associated with the sector, wherein the overlaying is in response to receiving the information.

20. The method of claim 1, wherein the response is generated if the UAV does not leave the sector within an interval of time.

* * * * *